United States Patent
Briaud et al.

(10) Patent No.: US 12,012,362 B2
(45) Date of Patent: Jun. 18, 2024

(54) COMPOSITIONS AND METHOD TO IMPROVE THE AESTHETICS OF CALCIUM SILICATE-BASED CEMENTS AND CONCRETES

(71) Applicant: SOLIDIA TECHNOLOGIES, INC., Piscataway, NJ (US)

(72) Inventors: Vincent Briaud, Jona (CH); Frédéric Cervera, Jona (CH); Vincent Meyer, Jona (CH); Sadananda Sahu, Tallahassee, FL (US); Ahmet Cuneyt Tas, Piscataway, NJ (US); Deepak Ravikumar, Piscataway, NJ (US); Jason Elizan Bryant, Easton, PA (US); Anuj Seth, East Brunswick, NJ (US)

(73) Assignee: SOLIDIA TECHNOLOGIES, INC., San Antonio, TX (US)

( * ) Notice: Subject to any disclaimer, the term of this patent is extended or adjusted under 35 U.S.C. 154(b) by 1403 days.

(21) Appl. No.: 16/198,060

(22) Filed: Nov. 21, 2018

(65) Prior Publication Data
US 2019/0152858 A1 May 23, 2019

Related U.S. Application Data

(60) Provisional application No. 62/589,302, filed on Nov. 21, 2017.

(51) Int. Cl.
| | |
|---|---|
| C04B 24/08 | (2006.01) |
| B32B 13/04 | (2006.01) |
| C04B 24/12 | (2006.01) |
| C04B 24/42 | (2006.01) |
| C04B 28/18 | (2006.01) |
| C04B 40/02 | (2006.01) |
| C04B 111/00 | (2006.01) |
| C04B 111/20 | (2006.01) |
| C04B 111/21 | (2006.01) |

(52) U.S. Cl.
CPC ............ C04B 28/188 (2013.01); B32B 13/04 (2013.01); C04B 24/08 (2013.01); C04B 24/085 (2013.01); C04B 24/122 (2013.01); C04B 24/42 (2013.01); C04B 40/0231 (2013.01); C04B 2111/0075 (2013.01); C04B 2111/2076 (2013.01); C04B 2111/21 (2013.01); Y02P 40/18 (2015.11)

(58) Field of Classification Search
CPC ..... C04B 28/188; C04B 24/08; C04B 24/085; C04B 24/122; C04B 24/42; C04B 40/0231; C04B 2111/0075; C04B 2111/2076; C04B 2111/21; C04B 28/18; C04B 40/02; C04B 28/02; C04B 24/12; C04B 14/043; C04B 24/121; B32B 13/04; Y02P 40/18; C01B 32/50
See application file for complete search history.

(56) References Cited

U.S. PATENT DOCUMENTS

| | | | |
|---|---|---|---|
| 8,114,367 B2 | 2/2012 | Riman et al. | |
| 9,221,027 B2 | 12/2015 | Kuppler et al. | |
| 2004/0107872 A1 | 6/2004 | Matsuyama et al. | |
| 2009/0142578 A1 | 6/2009 | Riman et al. | |
| 2009/0143211 A1 | 6/2009 | Riman et al. | |
| 2011/0104469 A1 | 5/2011 | Riman et al. | |
| 2011/0158873 A1* | 6/2011 | Riman ............... B01D 53/1456 423/220 |
| 2012/0312194 A1 | 12/2012 | Riman et al. | |
| 2013/0122267 A1 | 5/2013 | Riman et al. | |
| 2014/0093659 A1 | 4/2014 | Riman et al. | |
| 2014/0127450 A1 | 5/2014 | Riman et al. | |
| 2014/0127458 A1 | 5/2014 | Zambrzycki et al. | |
| 2014/0263683 A1 | 9/2014 | Krishnan et al. | |
| 2014/0272216 A1 | 9/2014 | Deo et al. | |
| 2014/0314990 A1 | 10/2014 | Henn et al. | |
| 2014/0342124 A1 | 11/2014 | Zambrzycki et al. | |
| 2014/0361471 A1 | 12/2014 | Hu et al. | |
| 2014/0363665 A1 | 12/2014 | Kuppler et al. | |
| 2015/0056437 A1 | 2/2015 | Deo et al. | |
| 2015/0203408 A1* | 7/2015 | Sroka ...................... C04B 28/02 106/2 |
| 2015/0225295 A1 | 8/2015 | McCandlish et al. | |
| 2015/0266778 A1 | 9/2015 | Riman et al. | |
| 2015/0336852 A1 | 11/2015 | Patten et al. | |
| 2016/0031757 A1 | 2/2016 | Atakan et al. | |
| 2016/0096773 A1 | 4/2016 | Quinn et al. | |
| 2016/0168720 A1 | 6/2016 | Jain et al. | |

(Continued)

FOREIGN PATENT DOCUMENTS

| | | |
|---|---|---|
| CN | 106007629 A | 10/2006 |
| JP | S63-210055 A | 8/1988 |

(Continued)

OTHER PUBLICATIONS

JP S63210055 A, machine translation (Year: 1988).*

(Continued)

*Primary Examiner* — Anthony J Green
*Assistant Examiner* — Marites A Guino-O Uzzle
(74) *Attorney, Agent, or Firm* — BRYAN CAVE LEIGHTON PAISNER LLP

(57) ABSTRACT

Carbonatable calcium silicate-based cements and concretes are presented, which result in concrete compositions that have an improved aesthetics. A cement product includes a plurality of particles of a carbonatable calcium silicate cement and a first additive; wherein, the first additive is a hydrophobic organic acid, or a salt thereof, or a silane, or a polysiloxane.

21 Claims, 8 Drawing Sheets

(56) References Cited

U.S. PATENT DOCUMENTS

| | | |
|---|---|---|
| 2016/0272544 A1 | 9/2016 | Sahu et al. |
| 2016/0272545 A1* | 9/2016 | Atakan ................. C04B 28/188 |
| 2016/0340261 A1 | 11/2016 | Atakan et al. |
| 2016/0355439 A1 | 12/2016 | McCandlish et al. |
| 2017/0102373 A1 | 4/2017 | Atakan et al. |
| 2017/0121223 A1 | 5/2017 | Atakan |
| 2017/0204010 A1 | 7/2017 | Atakan |
| 2017/0253530 A1 | 9/2017 | Sahu et al. |
| 2017/0260096 A1* | 9/2017 | Sahu ................... C04B 40/0231 |
| 2017/0320781 A1 | 11/2017 | Atakan et al. |
| 2017/0341989 A1 | 11/2017 | Jimenez et al. |
| 2018/0194693 A1 | 7/2018 | Quinn et al. |

FOREIGN PATENT DOCUMENTS

| | | | |
|---|---|---|---|
| JP | S63210055 A | * | 8/1988 |
| JP | 2005-089283 A | | 4/2005 |
| JP | 2005-187324 A | | 7/2005 |
| WO | WO 2009/102360 A2 | | 8/2009 |
| WO | WO 2011/053598 A1 | | 5/2011 |
| WO | WO 2011/090967 A1 | | 7/2011 |

OTHER PUBLICATIONS

Olga Shtepenko, Colin Hills, Adrian Brough, Mike Thomas, The effect of carbon dioxide on β-dicalcium silicate and Portland cement , Chemical Engineering Journal, 118 (2006) 107-118. DOI: 10.1016/j.cej.2006.02.005. (Year: 2006).*

SDS Eucon Blocktite (2016). [retrieved from the internet at Dec. 20, 2022 from <URL:https://www.buildsite.com/pdf/euclid/EUCON-BLOCKTITE-SDS-1709058.pdf>] (Year: 2016).*

International Search Report as issued in International Patent Application No. PCT/EP2018/082114, dated Feb. 5, 2019.

Database WPI, Week 198841, Thomson Scientific, AN-1988-288670, XP002788143, (2017), 1 page.

U.S. Appl. No. 61/708,423, filed Oct. 1, 2012.

* cited by examiner

COMPOSITIONS AND METHOD TO IMPROVE THE AESTHETICS OF CALCIUM SILICATE-BASED CEMENTS AND CONCRETES

CROSS-REFERENCE TO RELATED APPLICATIONS

This application claims priority to U.S. Provisional Patent Application No. 62/589,302, filed Nov. 21, 2017, the entire content of which is incorporated herein by reference in its entirety.

FIELD

The present invention relates to carbonatable calcium silicate-based cements and concretes, which result in concrete compositions that have an improved aesthetics.

BACKGROUND

Concrete is the most consumed man-made material in the world. Precast concrete products, such as pavers, blocks, hollow core slabs, roof tiles, aerated concrete blocks, etc., are widely used in construction, pavements and landscaping, to infrastructure and transportation.

A typical concrete product is made by mixing water and aggregates such as sand and crushed stone with Portland cement, a synthetic material made by burning a mixture of ground limestone and clay, or materials of similar composition in a rotary kiln at a sintering temperature of around 1,450° C. Portland cement manufacturing is not only an energy-intensive process, but also one that releases considerable quantities of greenhouse gas ($CO_2$). The cement industry accounts for approximately 5% of global anthropogenic $CO_2$ emissions. More than 60% of such $CO_2$ comes from the chemical decomposition or calcination of limestone.

Recently, a revolutionary form of cement that is based on carbonatable calcium silicate materials has emerged as a promising substitute to traditional cement and concrete products. Production of carbonatable calcium silicate-based cements and concrete products involves significantly reduced $CO_2$ emissions and energy consumption. In addition, this new cement sequesters $CO_2$ when cured into concrete products because $CO_2$ is needed to react with the carbonatable calcium silicate materials during the curing process to form concrete products.

However, even with these revolutionary forms of cements, users are always waiting for solutions to improve the aesthetics of concrete products.

DETAILED DESCRIPTION

Figure 1:
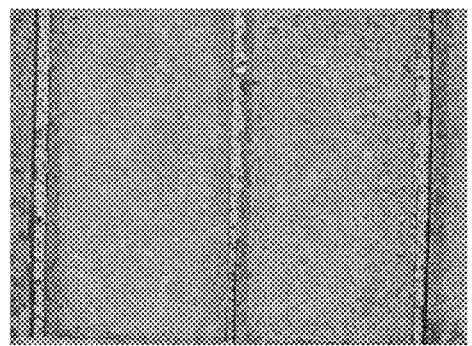
FIG. 1: Control pavers passing aesthetic requirement (Example 1). Control pavers exhibit haze.

The invention provides novel compositions of carbonatable calcium silicate-based cements and concretes and methods for improving aesthetics of calcium silicate-based cements and concretes. These improvements are achieved through the use of specific additives, included during the preparation of the cement or the concrete compositions.

In one aspect, the invention relates to the calcium silicate-based cement compositions. As used herein, the terms "cement composition" and "cement product" are equivalent.

These cement compositions comprise a plurality of calcium silicate cement particles, a first additive, and optionally a second additive. The calcium silicate cement of the invention is carbonatable and preferably comprises CaO and $SiO_2$ in a CaO to $SiO_2$ percentage by weight of oxides ratio of from about 0.7 to 1.8, more preferably 0.7 to 1.5, even more preferably of 0.8 to 1.2.

In an embodiment, the calcium silicate cement of the invention comprises from 30 to 55% wt. $SiO_2$; from 40 to 55% wt. CaO relative to the total weight of oxide and optionally further comprises from 1 to 8% wt. $Al_2O_3$; from 0.1 to 5% wt. $Fe_2O_3$; and/or from 0.1 to 2.5% wt. MgO relative to the total weight of oxide. The calcium silicate cement of the invention may optionally further comprise from 0.01 to 10% wt. $SO_3$; from 0.01 to 0.5% wt. $Na_2O$; from 0.1 to 2% wt. $K_2O$; from 0.01 to 0.5% wt. $TiO_2$; from 0.01 to 1% wt. $P_2O_5$; and/or from 0.01 to 0.5% wt. $Mn_2O_3$ relative to the total weight of oxide.

In another aspect, the invention relates to the calcium silicate-based concrete compositions. The concrete compositions comprise a plurality of carbonatable calcium silicate cement particles, a plurality of aggregate particles, a first additive, and optionally a second additive.

In another aspect, the cement of the invention enables to produce a concrete product comprising:
   the cement product of the invention, wherein the cement product is cured with a greenhouse gas comprising carbon dioxide to produce a structure comprising of a core, wherein the core comprises of a portion of the unreacted calcium silicate particle;
   a silica-rich layer covering at least a portion of the surface of the core; and
   an exterior layer covering at least a portion of the silica-rich first layer, wherein, the exterior layer comprises calcium carbonate.

In another aspect, the cement of the composition is non-hydraulic.

In yet another aspect, the invention relates to a method to improve aesthetics of calcium silicate-based materials that has the following steps:
   1. A first and potentially a second additive are added prior, during or after the grinding of a calcium silicate-based cement
   2. This calcium silicate-based composition is mixed with a plurality of aggregate particles to form a concrete composition.
   3. The concrete composition has a plurality of pores and is carbonated using a greenhouse gas that contains carbon dioxide.

According to an alternative method to improve aesthetics of calcium silicate-based materials, the following steps are used:

1. A calcium silicate-based cement is mixed with a plurality of aggregate particles to form a concrete composition;
   2. A first and potentially a second additive in powder or liquid form are added prior or during the mixing of the cement and the plurality of aggregate particle;
   3. The resulting concrete composition has a plurality of pores and is carbonated using a greenhouse gas that contains carbon dioxide.

In another aspect, the invention relates to a method for preparing a concrete product.

The invention also provides a concrete product comprising:
   the cement product of the invention, wherein the cement product is cured with a greenhouse gas comprising carbon dioxide to produce a structure comprising of a core, wherein the core comprises of a portion of the unreacted calcium silicate particle;
   a silica-rich layer covering at least a portion of the surface of the core; and
   an exterior layer covering at least a portion of the silica-rich first layer, wherein, the exterior layer comprises calcium carbonate;
   and a plurality of aggregate particles.

The invention also provides a method for preparing a concrete product comprising:
   mixing the cement according to the invention with a plurality of aggregate particles to form a concrete product having a plurality of pores.
   placing and forming the concrete product in molds;
   curing the formed concrete product with a greenhouse gas comprising carbon dioxide to produce a structure comprising of a core, wherein the core comprises of a portion of the unreacted carbonatable calcium silicate particle;
   a silica-rich layer covering at least a portion of the surface of the core; and
   an exterior layer covering at least a portion of the silica-rich first layer, wherein, the exterior layer comprises calcium carbonate;

In another aspect, the invention relates to a carbonatable composition comprising:
   Calcium silicate;
   One or more discrete calcium silicate phases selected from CS (wollastonite or pseudowollastonite), C3S2 (rankinite), C2S (belite, larnite, bredigite), and an amorphous calcium silicate phase at about 30%> or more by mass of the total phases; and calcium aluminate accounting for about 0.1% to about 2.5% by weight of the carbonatable composition,
   wherein elemental Ca and elemental Si are present in the composition at a molar ratio from about 0.8 to about 1.2; and metal oxides of Al, Fe and Mg are present in the composition at about 30% or less by mass,
   the first and the second additives, preferably calcium stearate and TEA.

Precast Objects of Carbonatable Calcium Silicate Cements

The term "calcium silicate" material, as used herein, generally refers to naturally-occurring minerals or synthetic materials that are comprised of one or more of a group of calcium silicate phases. "Carbonatable", as used herein, refers to a material that is reactive with $CO_2$ via a carbonation reaction under a condition disclosed herein. A material is "uncarbonatable" if it is unreactive with $CO_2$ via a carbonation reaction under a condition disclosed herein. Exemplary carbonatable calcium silicate phases include CS (wollastonite or pseudowollastonite, and sometimes formulated CaSiO₃ or CaO·SiO₂), C3S2 (rankinite, and sometimes formulated as Ca₃Si₂O₇ or 3CaO·2SiO₂), C2S (belite, (β-Ca2SiO₄ or larnite, Ca₇Mg(SiO₄)₄ or bredigite, α-Ca₂SiO₄ or γ-Ca₂SiO₄, and sometimes formulated as Ca₂SiO₄ or 2CaO·SiO₂). Amorphous phases can also be carbonatable depending on their composition. Each of these materials may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight. Exemplary uncarbonatable or inert phases include melilite ((Ca,Na,K)₂[(Mg, Fe²⁺,Fe³+,Al,Si)₃O₇]) and crystalline silica (SiO₂).

The carbonatable calcium silicate phases included in the calcium silicate composition do not hydrate when exposed to water. Due to this, composites produced using a calcium silicate composition as the binding agent do not generate significant strength when combined with water. The strength generation is controlled by exposure of calcium silicate composition containing composites to specific curing regimes in the presence of CO₂.

It should be understood that, calcium silicate compositions, phases and methods disclosed herein can be adopted to use magnesium silicate phases in place of or in addition to calcium silicate phases. As used herein, the term "magnesium silicate" refers to naturally-occurring minerals or synthetic materials that are comprised of one or more of a groups of magnesium-silicon-containing compounds including, for example, Mg₂SiO₄ (also known as "fosterite") and Mg₃Si₄O₁₀(OH)₂ (also known as "talc") and CaMgSiO₄ (also known as "monticellite"), each of which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

In exemplary embodiments, ground calcium silicate composition is used. The ground calcium silicate composition may have a mean particle size from about 1 μm to about 100 μm (e.g., about 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 1 μm to about 5 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm, about 1 μm, 10 μm, 15 μm, 20 μm, 25 μm, 30 μm, 40 μm, 50 μm, 60 μm, 70 μm, 80 μm, 90 μm, 100 μm), a bulk density from about 0.5 g/mL to about 3.5 g/mL (loose, e.g., 0.5 g/mL, 1.0 g/mL, 1.5 g/mL, 2.0 g/mL, 2.5 g/mL, 2.8 g/mL, 3.0 g/mL, 3.5 g/mL) and about 1.0 g/mL to about 1.2 g/mL (tapped), a Blaine surface area from about 150 m2/kg to about 700 m2/kg (e.g., 150 m2/kg, 200 m2/kg, 250 m2/kg, 300 m2/kg, 350 m2/kg, 400 m2/kg, 450 m2/kg, 500 m2/kg, 550 m2/kg, 600 m2/kg, 650 m2/kg, 700 m2/kg).

In exemplary embodiments of carbonation of the calcium silicate composition of the invention, ground calcium silicate particles used have a particle size having a cumulative 10% diameter greater than 1 μm in the volume distribution of the particle size distribution.

Any suitable aggregates may be used to form composite materials from the carbonatable composition of the invention, for example, calcium oxide-containing or silica-containing materials. Exemplary aggregates include inert materials such as trap rock, construction sand, pea-gravel. In certain preferred embodiments, lightweight aggregates such as perlite or vermiculite may also be used as aggregates. Materials such as industrial waste materials (e.g., fly ash, slag, silica fume) may also be used as fine fillers.

The plurality of aggregates may have any suitable mean particle size and size distribution. In certain embodiments, the plurality of aggregates has a mean particle size in the range from about 0.25 mm to about 25 mm (e.g., about 5 mm to about 20 mm, about 5 mm to about 18 mm, about 5 mm to about 15 mm, about 5 mm to about 12 mm, about 7 mm to about 20 mm, about 10 mm to about 20 mm, about ⅛", about ¼", about ⅜", about ½", about ¾").

Chemical admixtures may also be included in the composite material; for example, plasticizers, retarders, accelerators, dispersants and other rheology-modifying agents. Certain commercially available chemical admixtures such as Glenium™ 7500 by BASF® Chemicals and Acumer™ by Dow Chemical Company may also be included. In certain embodiments, one or more pigments may be evenly dispersed or substantially unevenly dispersed in the bonding matrices, depending on the desired composite material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight.

Carbonation of Carbonatable Calcium Silicate Cements

A major utility of the carbonatable composition is that it can be carbonated to form composite materials that are useful in a variety of application.

The following reactions are believed to take place during carbonation of calcium silicate as disclosed herein.

$$CaSiO_3(s)+CO_2(g) \rightarrow CaCO_3(s)+SiO_2(s) \qquad (1)$$

$$Ca_3Si_2O_7(s)+3CO_2(g) \rightarrow 3CaCO_3(s)+2SiO_2(s) \qquad (2)$$

$$Ca_2SiO_4(s)+2CO_2(g) \rightarrow 2CaCO_3(s)+SiO_2(s) \qquad (3)$$

Generally, CO₂ is introduced as a gas phase that dissolves into an infiltration fluid, such as water. The dissolution of CO₂ forms acidic carbonic species (such as carbonic acid, H₂CO₃) that results in a decrease of pH in solution. The weakly acidic solution incongruently dissolves calcium species from the calcium silicate phases. Calcium may be leached from calcium containing amorphous phases through a similar mechanism. The released calcium cations and the dissociated carbonate species lead to the precipitation of insoluble carbonates. Silica-rich layers are thought to remain on the mineral particles as calcium depleted layers.

The CaCO₃ produced from these or any other CO₂ carbonation reactions disclosed herein may exist as one or more of several CaCO₃ polymorphs (e.g., calcite, aragonite, and vaterite). The CaCO₃ particles are preferably in the form of calcite but may also be present as aragonite or vaterite or as a combination of two or three of the polymorphs (e.g., calcite/aragonite, calcite/vaterite, aragonite/vaterite or calcite/aragonite/vaterite).

Any suitable grade of CO₂ may be used depending on the desired outcome of carbonation. For example, industrial grade CO₂ at about 99% purity may be used, which is commercially available from a variety of different industrial gas companies, such as Praxair, Inc., Linde AG, Air Liquide, and others. The $CO_2$ supply may be held in large pressurized holding tanks in the form of liquid carbon dioxide regulated at a temperature such that it maintains a desired vapor pressure, for example, of approximately 300 PSIG. This gas is then piped to a $CO_2$ curing (carbonation) enclosure or chamber. In the simplest system, $CO_2$ is flowed through the enclosure at a controlled rate sufficient to displace the ambient air in the enclosure. In general, the purge time will depend on the size of the enclosure and the rate that $CO_2$ gas is provided. In many systems, this process of purging the enclosure of air can be performed in times measured in minutes to get the $CO_2$ concentration up to a reasonable level so that curing can be performed thereafter. In simple systems, $CO_2$ gas is then fed into the system at a predefined rate so to maintain a concentration of $CO_2$ sufficient to drive the curing reaction.

The carbonation, for example, may be carried out reacting it with $CO_2$ via a controlled Hydrothermal Liquid Phase Sintering (HLPS) process to create bonding elements that hold together the various components of the composite material. For example, in preferred embodiments, $CO_2$ is used as a reactive species resulting in sequestration of $CO_2$ and the creation of bonding elements in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions of various features of HLPS, carbonatable calcium silicate-based cements, carbonation and formation of bonding elements, apparatus and processes thereof, and related topics can be found in U.S. Pat. No. 8,114,367, U.S. Pub. No. US 2009/0143211 (application Ser. No. 12/271, 566), U.S. Pub. No. US 2011/0104469 (application Ser. No. 12/984,299), U.S. Pub. No. 2009/0142578 (application Ser. No. 12/271,513), U.S. Pub. No. 2013/0122267 (application Ser. No. 13/411,218), U.S. Pub. No. 2012/0312194 (application Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. Pub. No. 2014/0127450 (application Ser. No. 14/045,758), U.S. Pub. No. 2015/0266778 (application Ser. No. 14/045,519), U.S. Pub. No. 2014/0127458 (application Ser. No. 14/045,766), U.S. Pub. No. 2014/0342124 (application Ser. No. 14/045,540), U.S. Pub. No. 2014/0272216 (application Ser. No. 14/207,413), U.S. Pub. No. 2014/0263683 (application Ser. No. 14/207,421), U.S. Pat. Publ. No. 2014/0314990 (application Ser. No. 14/207,920), U.S. Pat. No. 9,221,027 (application Ser. No. 14/209,238), U.S. Pub. No. 2014/0363665 (application Ser. No. 14/295,601), U.S. Pub. No. 2014/0361471 (application Ser. No. 14/295, 402), U.S. Pub. No. 2016/0355439 (application Ser. No. 14/506,079), U.S. Pub. No. 2015/0225295 (application Ser. No. 14/602,313), U.S. Pub. No. 2015/0056437 (application Ser. No. 14/463,901), U.S. Pub. No. 2016/0168720 (application Ser. No. 14/584,249), U.S. Pub. No. 2015/0336852 (application Ser. No. 14/818,629), U.S. Pub. No. 2016/0031757 (application Ser. No. 14/817,193), U.S. Pub. No. 2016/0272544 (application Ser. No. 15/074,659), U.S. Pub. No. 2016/0096773 (application Ser. No. 14/874,350), U.S. Pub. No. 2016/0340261 (application Ser. No. 14/715,497), U.S. Pub. No. 2016/0272545 (application Ser. No. 15/074, 692), U.S. Pub. No. 2017/0102373 (application Ser. No. 15/290,328), U.S. Pub. No. 2017/0121223 (application Ser. No. 15/335,520), U.S. Pub. No. 2017/0204010 (application Ser. No. 15/409,352), U.S. Pub. No. 2017/0253530 (application Ser. No. 15/449,736), U.S. Pub. No. 2017/0260096 (application Ser. No. 15/451,344), U.S. Pub. No. 2017/0320781 (application Ser. No. 15/587,705), U.S. application Ser. No. 15/609,908, filed May 31, 2017, U.S. application Ser. No. 15/716,392, filed Sep. 26, 2017, each of which is expressly incorporated herein by reference in its entirety for all purposes.

Bonding Elements

The carbonation process produces a carbonated composite material that microscopically includes a plurality of bonding elements having one or more types of microstructure. Collectively, the plurality of bonding elements forms an inter-connected bonding matrix creating bonding strength and holding the composite material. For example, the microstructured bonding elements may be: a bonding element comprising a core of an unreacted carbonatable phase of calcium silicate fully or partially surrounded by a silica rich rim of varying thickness that is fully or partially encased by $CaCO_3$ particles; a bonding element comprising a core of silica formed by carbonation of a carbonatable phase of calcium silicate fully or partially surrounded by a silica rich rim of varying thickness that is fully or partially encased by $CaCO_3$ particles; a bonding element comprising a core of silica formed by carbonation of a carbonatable phase of calcium silicate and fully or partially encased by $CaCO_3$ particles; a bonding element comprising a core of an uncarbonatable phase fully or partially encased by $CaCO_3$ particles; a bonding element comprising a multi-phase core comprised of silica formed by carbonation of a carbonatable phase of calcium silicate and partially reacted calcium silicate, which multi-phase core is fully or partially surrounded by a silica rich rim of varying thickness that is fully or partially encased by $CaCO_3$ particles; a bonding element comprising a multi-phase core comprised of an uncarbonatable phase and partially reacted calcium silicate, which multi-phase core is fully or partially surrounded by a silica rich rim of varying thickness that is fully or partially encased by $CaCO_3$ particles; a bonding element comprising particles of partially reacted calcium silicate without a distinct core and silica rim encased by $CaCO_3$ particles; and a bonding element comprising porous particles without a distinct silica rim encased by $CaCO_3$ particles.

The silica rich rim generally displays a varying thickness within a bonding element and from bonding element to bonding element, typically ranging from about 0.01 μm to about 50 μm. In certain preferred embodiments, the silica rich rim has a thickness ranging from about 1 μm to about 25 μm. As used herein, "silica rich" generally refers to a silica content that is significant among the components of a material, for example, silica being greater than about 50% by volume. The remainder of the silica rich rim is comprised largely of $CaCO_3$, for example 10% to about 50% of $CaCO_3$ by volume. The silica rich rim may also include inert or unreacted particles, for example 10% to about 50% of melilite by volume. A silica rich rim generally displays a transition from being primarily silica to being primarily $CaCO_3$. The silica and $CaCO_3$ may be present as intermixed or discrete areas.

The silica rich rim is also characterized by a varying silica content from bonding element to bonding element, typically ranging from about 50% to about 90% by volume (e.g., from about 60% to about 80%). In certain embodiments, the silica rich rim is generally characterized by a silica content ranging from about 50% to about 90% by volume and a $CaCO_3$ content ranging from about 10% to about 50% by volume. In certain embodiments, the silica rich rim is characterized by a silica content ranging from about 70% to about 90% by volume and a $CaCO_3$ content ranging from about 10% to about 30% by volume. In certain embodiments, the silica rich rim is characterized by a silica content ranging from about 50% to about 70% by volume and a $CaCO_3$ content ranging from about 30% to about 50% by volume.

The silica rich rim may surround the core to various degrees of coverage anywhere from about 1% to about 99% (e.g., about 10% to about 90%). In certain embodiments, the silica rich rim surrounds the core with a degree of coverage less than about 10%. In certain embodiments, the silica rich rim of varying thickness surrounds the core with a degree of coverage greater than about 90%.

A bonding element may exhibit any size and any regular or irregular, solid or hollow morphology, which may be favored one way or another by raw materials selection and the production process in view of the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granulars, oblongs, rods, ripples, etc.

The plurality of bonding elements may have any suitable mean particle size and size distribution dependent on the desired properties and performance characteristics of the composite product. In certain embodiments, for example, the plurality of bonding elements have a mean particle size in the range of about 1 µm to about 100 µm (e.g., about 1 µm to about 80 µm, about 1 µm to about 60 µm, about 1 µm to about 50 µm, about 1 µm to about 40 µm, about 1 µm to about 30 µm, about 1 µm to about 20 µm, about 1 µm to about 10 µm, about 5 µm to about 90 µm, about 5 µm to about 80 µm, about 5 µm to about 70 µm, about 5 µm to about 60 µm, about 5 µm to about 50 µm, about 5 µm to about 40 µm, about 10 µm to about 80 µm, about 10 µm to about 70 µm, about 10 µm to about 60 µm, about 10 µm to about 50 µm, about 10 µm to about 40 µm, about 10 µm to about 30 µm, about 10 µm to about 20 µm).

The inter-connected network of bonding elements (a bonding matrix) may also include a plurality of coarse or fine filler particles that may be of any suitable material, have any suitable particle size and size distribution. In certain preferred embodiments, for example, the filler particles are made from a calcium carbonate-rich material such as limestone (e.g., ground limestone). In certain materials, the filler particles are made from one or more of $SiO_2$-based or silicate-based material such as quartz, mica, granite, and feldspar (e.g., ground quartz, ground mica, ground granite, ground feldspar).

In certain embodiments, filler particles may include natural, synthetic and recycled materials such as glass, recycled glass, coal slag, fly ash, calcium carbonate-rich material and magnesium carbonate-rich material.

In certain embodiments, the plurality of filler particles has a mean particle size in the range from about 5 µm to about 7 mm (e.g., about 5 µm to about 5 mm, about 5 µm to about 4 mm, about 5 µm to about 3 mm, about 5 µm to about 2 mm, about 5 µm to about 1 mm, about 5 µm to about 500 µm, about 5 µm to about 300 µm, about 20 µm to about 5 mm, about 20 µm to about 4 mm, about 20 µm to about 3 mm, about 20 µm to about 2 mm, about 20 µm to about 1 mm, about 20 µm to about 500 µm, about 20 µm to about 300 µm, about 100 µm to about 5 mm, about 100 µm to about 4 mm, about 100 µm to about 3 mm, about 100 µm to about 2 mm, about 100 µm to about 1 mm).

The weight ratio of bonding elements to filler particles may be any suitable ratios dependent on the intended application for the composite material product. For example, the weight ratio of bonding elements to filler particles may be in the range from about (50 to 99): about (1 to 50), e.g., from about (60 to 99): about (1 to 40), from about (80 to 99): about (1 to 20), from about (90 to 99): about (1 to 10), from about (50 to 90): about (10 to 50), from about (50 to 70): about (30 to 50). In certain embodiments depending on the application, the weight ratio of bonding elements to filler particles may be in the range from about (10 to 50): about (50 to 90), e.g., from about (30 to 50): about (50 to 70), from about (40 to 50): about (50 to 60).

Additional background discussions and examples of curing systems and related topics may be found in U.S. Pat. No. 9,221,027, U.S. Pub. No. 2015/0225295 (application Ser. No. 14/602,313), U.S. Pub. No. 2015/0336852 (application Ser. No. 14/818,629), U.S. Pub. No. 2017/0102373 (application Ser. No. 15/290,328), each of which is expressly incorporated herein by reference in its entirety for all purposes.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

Compositions and Method to Improve the Aesthetics of Calcium Silicate-Based Cements and Concretes The invention provides novel compositions of carbonatable calcium silicate-based cements and concretes and methods for improving aesthetics of calcium silicate-based cements and concretes.

In another aspect, the cement of the invention enables to produce a concrete product comprising:
- the cement product of the invention, wherein the cement product is cured with a greenhouse gas comprising carbon dioxide to produce a structure comprising of a core, wherein the core comprises of a portion of the unreacted calcium silicate particle;
- a silica-rich layer covering at least a portion of the surface of the core; and
- an exterior layer covering at least a portion of the silica-rich first layer, wherein, the exterior layer comprises calcium carbonate;

In another aspect, the cement of the composition is non-hydraulic.

In one aspect, the invention provides calcium-silicate based cement compositions comprising a plurality of carbonatable calcium silicate cement particles, a first additive, optionally a second additive.

These improvements are achieved through the use of specific additives, included during the preparation of the cement or the concrete compositions.

Preferably, the cement compositions comprise a plurality of carbonatable calcium silicate cement particles, a first additive and a second additive.

The first additive is a hydrophobic organic acid, or a salt thereof, or a silane, or a polysiloxane.

The hydrophobic compound is in the form of powder, emulsion or liquid.

Preferably, the hydrophobic organic acid, or a salt thereof, is one or more fatty acid(s), or one or more salt(s) thereof, advantageously one or more alkali or alkali-earth metal salt(s) thereof, more advantageously a calcium or sodium salt(s) thereof.

The fatty acid according to this invention is a carboxylic acid with a long aliphatic chain, which is either saturated or unsaturated, preferably is saturated. Preferably, the long aliphatic chain has carbon atoms from 4 to 35, even more preferably from 5 to 28 carbon atoms.

Advantageously, the long aliphatic chain has carbon atoms from 10 to 35, more advantageously from 10 to 28 carbon atoms, even more advantageously from 10 to 20 carbon atoms and may be either saturated or unsaturated, preferably is saturated.

Advantageously, the long aliphatic chain has 10, 11, 12, 13, 14, 15, 16, 17, 18, 19 or 20 carbon atoms and may be either saturated or unsaturated, preferably is saturated.

Preferably, the fatty acid, or a salt thereof, is selected from the group consisting of a stearic acid, or a salt thereof; an oleic acid, or a salt thereof; an arachidic acid, or a salt thereof; a palmitic acid, or a salt thereof; an arachidonic acid, or a salt thereof; an erucic acid, or a salt thereof; a linoleic acid, or a salt thereof; a linolenic acid, or a salt thereof; a lauric acid, or a salt thereof; a valeric acid, or a salt thereof; or a combination thereof.

More advantageously, the fatty acid, or a salt thereof, is selected from the group consisting of lauric acid, or a salt thereof; stearic acid, or a salt thereof; oleic acid, or a salt thereof; or a combination thereof.

Preferably, the fatty acid is stearic acid or a salt thereof. More preferably, a salt of the fatty acid is calcium stearate. As an alternative, a salt of the fatty acid is sodium oleate.

The second additive is an organic molecule with at least one primary, secondary or tertiary amine group.

Preferably, the second additive is an organic molecule with at least one primary, secondary or tertiary amine group comprising at least one hydroxy group.

More preferably, the second additive is one or a combination of one or more hydroxyalkylamine(s) that has a maximum molar weight of 1000 g/mol.

In some embodiments, the first additive is an organic molecule having at least one primary, secondary or tertiary amine group and at least two hydroxy groups.

In some embodiments, the first additive is an organic molecule having at least one primary, secondary or tertiary amine group and at least three hydroxy groups.

In some embodiments, the second additive is selected from the group consisting of N,N bis-(2-hydroxyethyl)-2-propanolamine) (DIEPA), N, N bis-(2-25 hydroxypropyl)-N-(hydroxyethyl) amine (EDIPA), diethanolamine (DEA), triethanolamine (TEA), triisopropanolamine (TIPA), triethylenetetramine (TETA), triethylenepentamine (TEPA), hydroxyethyldiethylenetriamine (HEDETA), and aminoethylethanolamine (AEEA) or a combination thereof.

Preferably, the second additive is selected from the group consisting of N,N bis-(2-hydroxyethyl)-2-propanolamine) (DI EPA), triethanolamine (TEA) and triisopropanolamine (TIPA) or a combination thereof.

More preferably, the second additive is TEA.

Preferably, the quantity of first additive in the cement compositions of the invention is comprised between 0.1 wt. % and 2.0 wt. % of the amount of cement.

Advantageously, the quantity of the first additive in the cement compositions of the invention is comprised between 0.1 wt. % and 0.3 wt. % of the amount of cement; 0.1 wt. % and 0.5 wt. % of the amount of cement; 0.1 wt. % and 1.0 wt. % of the amount of cement; 0.1 wt. % and 1.5 wt. % of the amount of cement; 0.2 wt. % and 0.5 wt. % of the amount of cement; 0.5 wt. % and 1.5 wt. % of the amount of cement; or 1.0 wt. % and 2.0 wt. % of the amount of cement.

Preferably, the quantity of second additive in the cement compositions of the invention is comprised between 0.1 wt. % and 2.0 wt. % of the amount of cement.

Advantageously, the quantity of the second additive in the cement compositions of the invention is comprised between 0.1 wt. % and 0.3 wt. % of the amount of cement; 0.1 wt. % and 0.5 wt. % of the amount of cement; 0.1 wt. % and 1.0 wt. % of the amount of cement; 0.1 wt. % and 1.5 wt. % of the amount of cement; 0.2 wt. % and 0.5 wt. % of the amount of cement; 0.5 wt. % and 1.5 wt. % of the amount of cement; or 1.0 wt. % and 2.0 wt. % of the amount of cement.

In another aspect, the invention relates to a method to increase aesthetics of calcium silicate-based materials comprising the addition of the first and potentially the second additive during or after the grinding of a calcium silicate-based cement or during the mixing of the cement with a plurality of aggregate particles to form a concrete composition.

In one embodiment, this method to increase aesthetics of calcium silicate-based materials has the following steps:
1. the first and potentially the second additive are added prior, during or after the grinding of a calcium silicate-based cement;
2. this calcium silicate-based composition is mixed with a plurality of aggregate particles to form a concrete composition;
3. the concrete composition has a plurality of pores and is carbonated using a greenhouse gas that contains carbon dioxide.

Preferably, the quantity of first additive in the first step is comprised between 0.1 wt. % and 2.0 wt. % of the amount of cement.

Preferably, the quantity of second additive in first step is comprised between 0.1 wt. % and 2.0 wt. % of the amount of cement.

Preferably, this embodiment of a method to increase aesthetics of calcium silicate-based materials has the following steps:
1. the first and the second additives are added prior, during or after the grinding of a calcium silicate-based cement;
2. this calcium silicate-based composition is mixed with a plurality of aggregate particles to form a concrete composition;
3. the concrete composition has a plurality of pores and is carbonated using a greenhouse gas that contains carbon dioxide.

More preferably, this embodiment of a method to increase aesthetics of calcium silicate-based materials has the following steps:
1. calcium stearate and TEA are added prior, during or after the grinding of a calcium silicate-based cement;
2. this calcium silicate-based composition is mixed with a plurality of aggregate particles to form a concrete composition;
3. the concrete composition has a plurality of pores and is carbonated using a greenhouse gas that contains carbon dioxide.

Preferably, the quantity of calcium stearate in the first step is comprised between
0.1 wt. % and 2.0 wt. % of the amount of cement.

Preferably, the quantity of TEA in the first step is comprised between 0.1 wt. % and 2.0 wt. % of the amount of cement.

In another embodiment, this method to increase aesthetics of calcium silicate-based materials, has the following steps:
1. a calcium silicate-based cement is mixed with a plurality of aggregate particles to form a concrete composition;
2. the first and potentially the second additive are added prior or during the mixing of the cement and the plurality of aggregate particles;
3. the resulting concrete composition has a plurality of pores and are carbonated using a greenhouse gas that contains carbon dioxide.

Preferably, the quantity of first additive in second step is comprised between 0.1 wt. % and 2.0 wt. % of the amount of cement.

Preferably, the quantity of second additive in second step is comprised between 0.1 wt. % and 2.0 wt. % of the amount of cement.

Preferably, this embodiment of a method to increase aesthetics of calcium silicate-based materials has the following steps:
1. a calcium silicate-based cement is mixed with a plurality of aggregate particles to form a concrete composition;
2. the first and the second additives are added prior or during the mixing of the cement and the plurality of aggregate particle;
3. the resulting concrete composition has a plurality of pores and are carbonated using a greenhouse gas that contains carbon dioxide.

More preferably, this embodiment of a method to increase strength of calcium silicate-based materials has the following steps:
1. a calcium silicate-based cement is mixed with a plurality of aggregate particles to form a concrete composition;
2. TEA and gypsum are added prior or during the mixing of the cement and the plurality of aggregate particle;
3. the resulting concrete composition has a plurality of pores and are carbonated using a greenhouse gas that contains carbon dioxide.

Preferably, the quantity of calcium stearate in the second step is comprised between 0.1 wt. % and 2.0 wt. % of the amount of cement.

Preferably, the quantity of TEA in the second step is comprised between 0.1 wt. % and 2.0 wt. % of the amount of cement.

In another embodiment, this method to increase aesthetics of calcium silicate-based materials, has the following steps:
1. grinding of a calcium silicate-based cement;
2. mixing of the cement with a plurality of aggregate particles to form a concrete composition;
wherein one of the two additives is added prior, during or after the grinding of the calcium silicate-based cement and the other is added prior or during the mixing of the cement and the plurality of aggregate particles;
3. the resulting concrete composition has a plurality of pores and are carbonated using a greenhouse gas that contains carbon dioxide.

Preferably, the quantity of each additive is comprised between 0.1 wt. % and 2.0 wt. % of the amount of cement.

Preferably, this embodiment of a method to increase strength of calcium silicate-based materials has the following steps:
1. grinding of a calcium silicate-based cement;
2. mixing of the cement with a plurality of aggregate particles to form a concrete composition;
wherein one of calcium stearate or TEA is added prior, during or after the grinding of the calcium silicate-based cement and the other is added prior or during the mixing of the cement and the plurality of aggregate particles;
3. the resulting concrete composition has a plurality of pores and are carbonated using a greenhouse gas that contains carbon dioxide.

Preferably, the quantity of calcium stearate is comprised between 0.1 wt. % and 2.0 wt. % of the amount of cement.

Preferably, the quantity of TEA is comprised between 0.1 wt. % and 2.0 wt. % of the amount of cement.

The invention also provides a concrete product comprising:
the cement product of the invention, wherein the cement product is cured with a greenhouse gas comprising carbon dioxide to produce a structure comprising of a core, wherein the core comprises of a portion of the unreacted calcium silicate particle;
a silica-rich layer covering at least a portion of the surface of the core; and
an exterior layer covering at least a portion of the silica-rich first layer, wherein, the exterior layer comprises calcium carbonate; and
a plurality of aggregate particles.

The invention also provides a method for preparing a concrete product comprising:
mixing the cement according to the invention with a plurality of aggregate particles to form a concrete product having a plurality of pores.
placing and forming the concrete product in molds
curing the formed concrete product with a greenhouse gas comprising carbon dioxide to produce a structure comprising of a core, wherein the core comprises of a portion of the unreacted carbonatable calcium silicate particle;

a silica-rich layer covering at least a portion of the surface of the core; and an exterior layer covering at least a portion of the silica-rich first layer, wherein, the exterior layer comprises calcium carbonate.

The invention also provides a carbonatable composition comprising:

Calcium silicate;

One or more discrete calcium silicate phases selected from CS (wollastonite or pseudowollastonite), C3S2 (rankinite), C2S (belite, larnite, bredigite), and an amorphous calcium silicate phase at about 30%> or more by mass of the total phases; and calcium aluminate accounting for about 0.1% to about 2.5% by weight of the carbonatable composition, wherein elemental Ca and elemental Si are present in the composition at a molar ratio from about 0.8 to about 1.2; and metal oxides of Al, Fe and Mg are present in the composition at about 30% or less by mass, the first and the second additives, preferably calcium stearate and TEA.

Preferably, the carbonatable composition of the invention is suitable for carbonation with $CO_2$ at a temperature of about 30° C. to about 90° C. to form $CaCO_3$ with a mass gain of about 10% or more.

EXAMPLES

Carbonatable Calcium Silicate-Based Cement Compositions

In the examples, two different cements are used: Cement 1 and Cement 2. Their chemical compositions are provided in table 1 below.

|  | Range of compositions |
| --- | --- |
| LOI (%) | 0 to 2 |
| $SiO_2$ (%) | 30 to 55 |
| $Al_2O_3$ (%) | 1 to 8 |
| $Fe_2O_3$ (%) | 0.1 to 5 |
| CaO (%) | 40 to 55 |
| MgO (%) | 0.1 to 2.5 |
| $SO_3$ (%) | 0.01 to 10 |
| $Na_2O$ (%) | 0.01 to 0.5 |
| $K_2O$ (%) | 0.1 to 2 |
| $TiO_2$ (%) | 0.01 to 0.5 |
| $P_2O_5$ (%) | 0.01 to 1 |
| $Mn_2O_3$ (%) | 0.01 to 0.5 |

Method for Producing a Through Body/Face Mix Paver

Concrete pavers were produced by mixing the following solid components, Solidia Cement, coarse aggregate, fine aggregate and pigments along with water and concrete additives in a planetary mixer.

For a through body paver, the wet concrete mix was then loaded into a hopper of a concrete paver press. The paver press molds were filled with the desired quantity of the concrete mix. Concrete mix was then vibro-pressed to produce a green concrete paver of density ranging from 2.1 g/cc to 2.45 g/cc. For a face mix paver an additional thin layer of fine concrete mix was pressed on top having a thickness ranging between 8 and 12 mm. The total height of the pavers produced in this study was 58 to 62 mm. Similar results are expected for thicker or thinner pavers.

These green concrete pavers were then loaded into a curing chamber and subjected to $CO_2$ concentration above 90%, temperature ranging between 50 to 80° C., a relative humidity ranging between 10 and 80% until the pavers are cured through the entire cross section. These pavers are then tested for haze and wet paver surface as described below.

Method for Assessing the Aesthetics of Concrete Pavers

Pavers were installed on a layer of paver base sand with joint sand filled between the pavers. If a ground for installation was not available a box with a layer of paver base sand was prepared for paver placement. Once installed, pavers were subjected to simulated rain cycles lasting up to 30 minutes.

Pavers underwent continuous wetting and drying cycles for a minimum of 2 weeks.

If no white precipitates were seen on the surface of the paver when viewed at a distance of 6 ft from the ground, the pavers were considered pass for haze.

If the pavers dried out in less than 3 hours or on par with a similarly installed Portland cement-based paver the pavers were considered pass for wet paver surface.

Example 1

Control Sample for Aesthetics

Pavers with the following mix design were produced to test a composition that does not contain any haze mitigation additives such as slag, TEA or calcium stearate. The pigment is added to increase the visibility of any hazing that may occur. This was a single layered through body paver.

TABLE 2

|  | Mass % of Solids component |
| --- | --- |
| Cement 1 | 15.81% |
| Sahara Sand | 40.52% |
| Sewer Sand | 21.01% |
| ¼" Aggregate | 22.51% |
| Pigment | 0.15% |

The following admixtures were added to the mix:

BASF Masterset: 3 mL/kg of cement

Sika Plastocrete: 7 mL/kg of cement

The concrete mix (solids+water+admixtures) used to produce these samples contained 5.9 wt. % of water, expressed as a percentage of the total amount of solids.

These pavers exhibited haze as shown in FIG. 1.

Example 2

TEA for Haze Mitigation

Solidia Cement based pavers with two distinct layers were produced with the following mix design having TEA in both the base and face layer at a dosage of 5 mL/kg of cement. The mix design for the base and face mix is provided below.

TABLE 3

| Base mix design: | |
| --- | --- |
|  | Mass % of Solids component |
| Cement 1 | 14.70% |
| Construction Sand | 46.85% |
| ¼" Aggregate | 38.30% |
| Pigment | 0.15% |

TABLE 4

Face mix design:

| | Mass % of Solids component |
|---|---|
| Cement 1 | 19.30% |
| Dark mason sand | 20.00% |
| Sewer sand | 59.80% |
| Pigment | 0.90% |

The following admixtures were also added for both face and base mix:
BASF Masterset: 3 mL/kg of cement
Sika Plastocrete: 7 mL/kg of cement
Sika AE3 1.5 mL/kg of cement The concrete mix (solids+water+admixtures) used to produce these samples contained 4.68 wt. % of water, expressed as a percentage of the total amount of solids.

The concrete mix (solids+water+admixtures) used to produce the face mix for these samples contained 6.17% of water.

With TEA at a dosage of 5 mL/kg of cement, no haze was observed after multiple wetting and drying cycles.

Example 3

Calcium Stearate for Haze Mitigation

Cement 1 based pavers with two distinct layers were produced with the following mix design having E-Chem 205 (Calcium stearate dispersion) in both the base and face layer at a dosage of 5 mL/kg of cement. The mix design for the base and face mix is provided below.

TABLE 5

Base mix design:

| | Mass % of Solids component |
|---|---|
| Cement 1 | 14.70% |
| Construction Sand | 46.85% |
| ¼" Aggregate | 38.30% |
| Pigment | 0.15% |

TABLE 6

Face mix design:

| | Mass % of Solids component |
|---|---|
| Cement 1 | 19.30% |
| Dark mason sand | 20% |
| Sewer sand | 59.80% |
| Pigment | 0.90% |

The following admixtures were also added for both face and base mix:
BASF Masterset: 3 mL/kg of cement
Sika Plastocrete: 7 mL/kg of cement
Sika AE3 1.5 mL/kg of cement The concrete mix (solids+water+admixture) used to produce the base mix for these samples contained 4.09% of water.

The concrete mix (solids+water+admixture) used to produce the face mix for these samples contained 6.07% of water.

Figure 2:
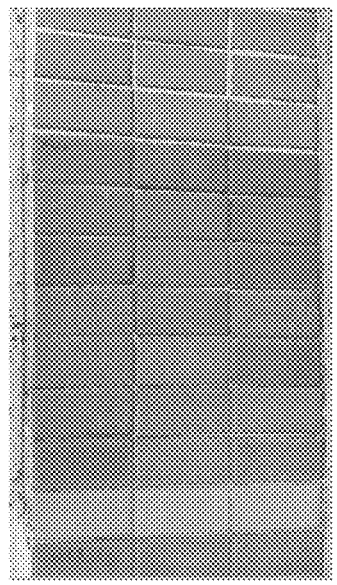
FIG. 2: Pavers of the invention passing aesthetic requirement (Example 3). No haze was observed in the pavers of the invention containing calcium stearate. Pavers of the invention dried quick and uniform and passed aesthetic requirements.

No haze was observed in the pavers made with the above combination. Pavers dried quick and uniform and passed aesthetic requirements, as seen in FIG. 2.

Example 4

Combination of TEA+Calcium Stearate for Haze Mitigation

Solidia cement based pavers were produced with the following mix design with calcium stearate and TEA.

TABLE 7

| | Mass % of Solids component |
|---|---|
| Cement 1 | 14.70% |
| Construction Sand | 39.85% |
| ¼" Aggregate 1 | 14.74% |
| ¼" Aggregate 2 | 14.74% |
| Slag aggregate | 12.64% |
| Concrete recycled material | 3.19% |
| Pigment | 0.14% |

TABLE 8

| | Mass % of Solids component |
|---|---|
| Cement 1 | 19.32% |
| Dark mason sand | 20.01% |
| Sewer sand | 59.74% |
| Pigment | 0.93% |

The following admixtures were added to both face and base mix:

Conxl DM 360 (polycarboxylate water reducer): 3 mL/kg of cement

BASF Masterset: 5 mL/kg of cement

E-Chem 205 (Calcium stearate colloid): 15 mL/kg of cement

TEA was added only to the face mix at a dosage of 5 mL/kg of cement.

The concrete mix (solids+water+admixtures) used to produce the base and face mix for these samples contained 3.89-5.00% of water with an average of 4.5% based of a sample size of 11.

Figure 3:
FIG. 3: Pavers passing aesthetic requirement (Example 4). No haze was observed in the pavers of the invention containing TEA and calcium stearate. Pavers of the invention dried quick and uniform and passed aesthetic requirements.

No haze was observed in the pavers made with the above combination. Pavers dried quick and uniform and passed aesthetic requirement, as seen in FIG. 3.

Example 5

Addition of TEA, Gypsum, and their Combination

In this example WHL2016 cement was used to perform small concrete elements (8×8×1 cm). In this specific example, the hazing was measured following the method described in the standard ASTM C67 (ASTM C67-17, Standard Test Methods for Sampling and Testing Brick and Structural Clay Tile, ASTM International, West Conshohocken, PA, 2017). The additives are added during the preparation of the concrete.

TABLE 9

Concrete composition:

| | Mass (g) | Weight % |
|---|---|---|
| Cement 1 | 490.9 | 24 |
| Sand 0/2 normalized | 1350 | 67 |
| Water | 186.5 | 9 |

Results:

TABLE 10

| | Observation |
|---|---|
| Concrete without additives - Control | Visible hazing |
| Concrete with 0.5 wt. % calcium stearate (wt. % of cement) | No hazing |
| Concrete with 0.5 wt. % TEA and 2 wt. % gypsum (wt. % of cement) | No hazing |

The results show that adding calcium stearate at 0.5 wt. % of the cement or adding TEA at 0.5 wt. % of cement in combination with added at 2 wt. % cement, hazing is not visible anymore.

The same experiments were performed with Cement 2. This cement, compared to Cement 1, contains very low amounts of sulfates, which would then naturally not be prone to hazing. In order to have reproducible results, 0.7 wt. % of K2SO4 was added to Cement 2. Different hazing mitigation solutions were tested.

TABLE 11

Concrete composition:

| | Mass (g) | Weight % |
|---|---|---|
| Cement 2 + 0.7 wt. % $K_2SO_4$ | 490.9 | 24 |
| Sand 0/2 normalized | 1350 | 67 |
| Water | 186.5 | 9 |

Results:

TABLE 12

| | Observation |
|---|---|
| Concrete without additives - Control | Visible hazing |
| Concrete with 0.5 wt. % calcium stearate (wt. % of cement) | No hazing |
| Concrete with 0.5 wt. % TEA and 2 wt. % gypsum (wt. % of cement) | Mitigated hazing |
| Concrete with 0.5 wt. % TEA (wt. % of cement) | No hazing |

The reference concretes were tested according to ASTMC67. The results show that the addition of calcium stearate at 0.5 wt. % of cement, or TEA at 0.5 wt. % of cement resulted in no hazing occurring at all. With TEA at 0.5 wt. % of cement in combination with gypsum at 2 wt. % of cement, hazing was mitigated, however not eliminated.

Example 6

Measurement of Water Ingress with Fatty Acids, Salts of Fatty Acids, and Silanes Water ingress is a major contributor to the visible deposition of salts on concrete surfaces often referred to as efflorescence. Fatty acids, salts of fatty acids, and silanes can be used in CCSC Concrete to limit the ingress of water and subsequently mitigate the occurrence of efflorescence or other aesthetic defects.

Testing in CCSC Mortar Specimens

In order to evaluate the impact of fatty acids, salts of fatty acids, and silanes on aesthetic performance and efflorescence mitigation, CCSC mortar specimens were prepared according to raw material proportions specified in the tables below and evaluated for water sorptivity (ASTM C1585) and efflorescence potential (ASTM C67). For water sorptivity, samples were submerged in 2±1 mm of water, and the mass of water uptake was measured over the course of 96 hours. Samples tested for efflorescence potential were partially submerged in 10% NaCl solution for 7 days in order to simulate severe efflorescence.

Each mortar was mixed for 4 min using a Hobart mixer and compacted into 100×60 mm cyclinders using a 2 kg press head. Fatty acids, salts of fatty acids, or silanes were added at the time of mixing following the addition of water and dosed by percent weight of cement (% bwoc).

TABLE 13

CCSC Mortar Mix Proportions:

| Mix Components | Type | Material Proportions |
|---|---|---|
| Binder | CCSC | 362 g |
| Fine aggregate | ASTM graded sand | 1500 g |
| w/c ratio | | 0.35 |

TABLE 14

Description of Additives:

| Additive | Type (C:D) | Dosage, % bwoc |
|---|---|---|
| Valeric acid | Short-chain fatty acid (5:0) | 0.25% |
| Lauric acid | Medium-chain fatty acid (12:0) | 0.25% |
| Oleic acid | Long-chain fatty acid (18:1) | 0.25% |
| Stearic acid | Long-chain fatty acid (18:0) | 0.25% |
| Na-oleate | Sodium salt of oleic acid | 1.00% |
| Ca-stearate | Calcium salt of stearic acid | 1.00% |
| Silane A | Proprietary | 0.25% |
| Silane B | Proprietary | 0.25% |

"Silane A" refers to an admixture commercialized by ACM Chemistries, Norcross, GA that belongs to the Colorscape family®.
"Silane B" refers to an admixture commercialized by ACM Chemistries, Norcross, GA under the product identifier RainBloc® 80.

Figure 4:
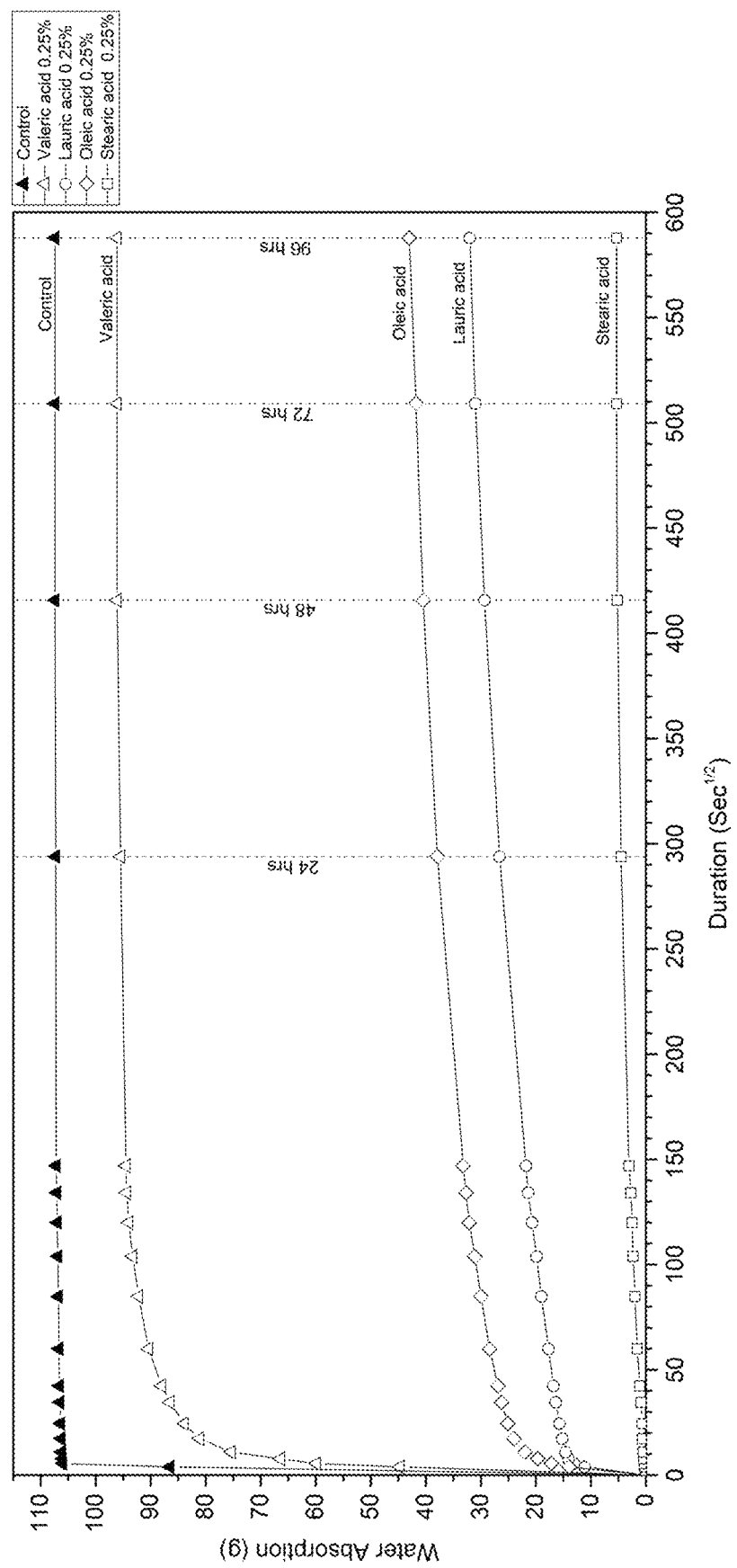
FIG. 4: Water absorption of mortar mixes containing no additive (Control, -▲-) fatty acids (Example 6) among valeric acid 0.25 wt. % (-Δ-); lauric acid 0.25 wt. %, (-◇-); oleic acid 0.25 wt. %(-◊-), and stearic acid 0.25 wt. %(-□-). Relative to the control, all specimens of the invention containing fatty acids exhibit reduced rate and total absorption of water.
Figure 5:
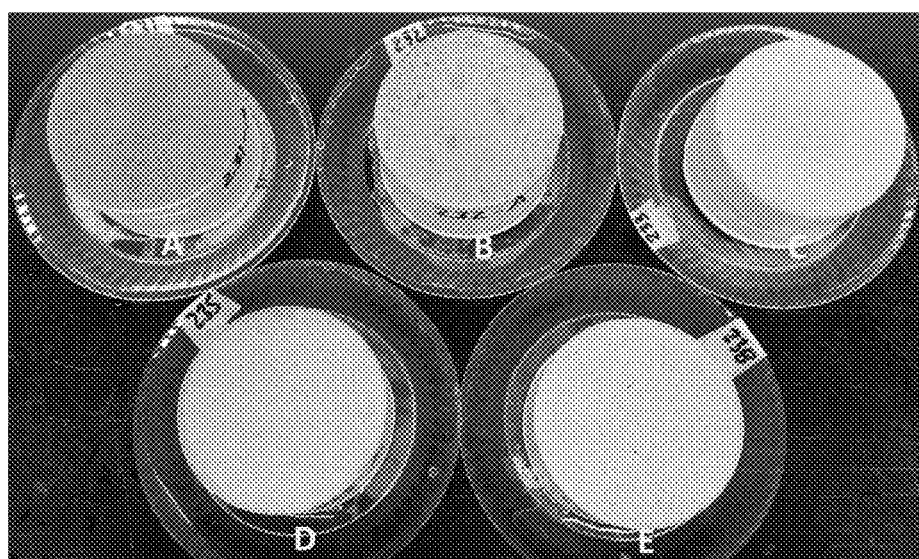
FIG. 5: Mortar specimens shown at the end of water absorption testing. Relative to the (A) control, specimens of the invention containing (B) valeric acid 0.25 wt. %, (C) lauric acid 0.25 wt. %, (D) oleic acid 0.25 wt. %, and (E) stearic acid 0.25 wt. % exhibit reduced rate and total absorption of water (Example 6). Relative to the control mix, each of the representative fatty acids reduced the rate of water absorption and total quantity of water absorbed throughout the course of testing. Particularly good results were obtained with stearic acid.

Water sorptivity measurements for CCSC specimens containing short, medium, and long-chain fatty acids are shown in FIG. 4. Example specimens of each mix are shown in FIG. 5 after sorptivity testing. Relative to the control mix, each of the representative fatty acids reduced the rate of water absorption and total quantity of water absorbed throughout the course of testing. Particularly good results were obtained with stearic acid.

Figure 6:
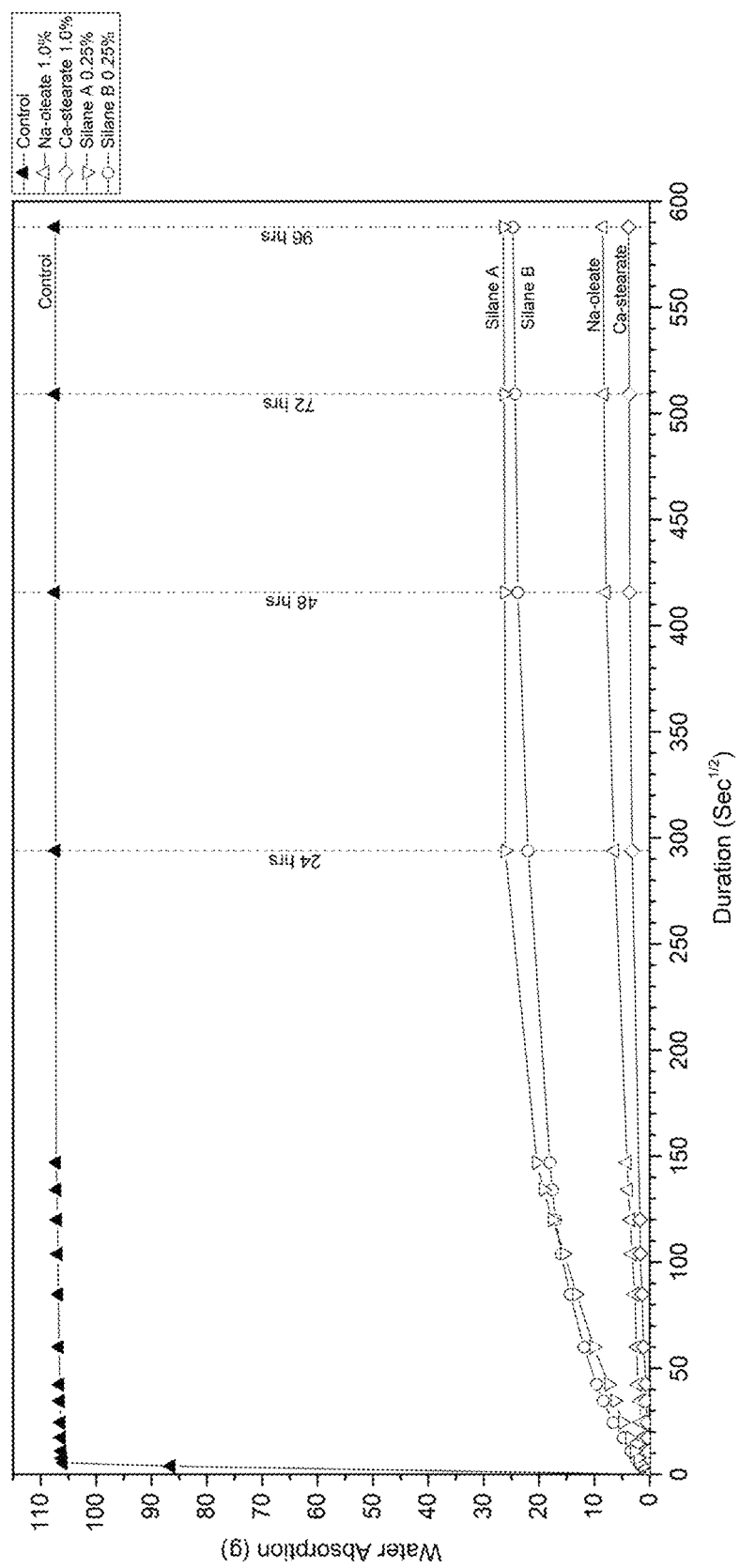
FIG. 6: Water absorption of mortar mixes containing no additive (Control; -▲-) or mortar mixes of the invention containing salts of fatty acids (Na-oleate 1.0 wt. % -Δ-; or Ca-stearate 1.0% wt.; -◇-) or proprietary silanes A and B (Silane A -▽-; or Silane B -◊-) (Example 6). Both the salts of fatty acids and the silanes reduced the rate and total absorption of water relative to the control mix.
Figure 7:
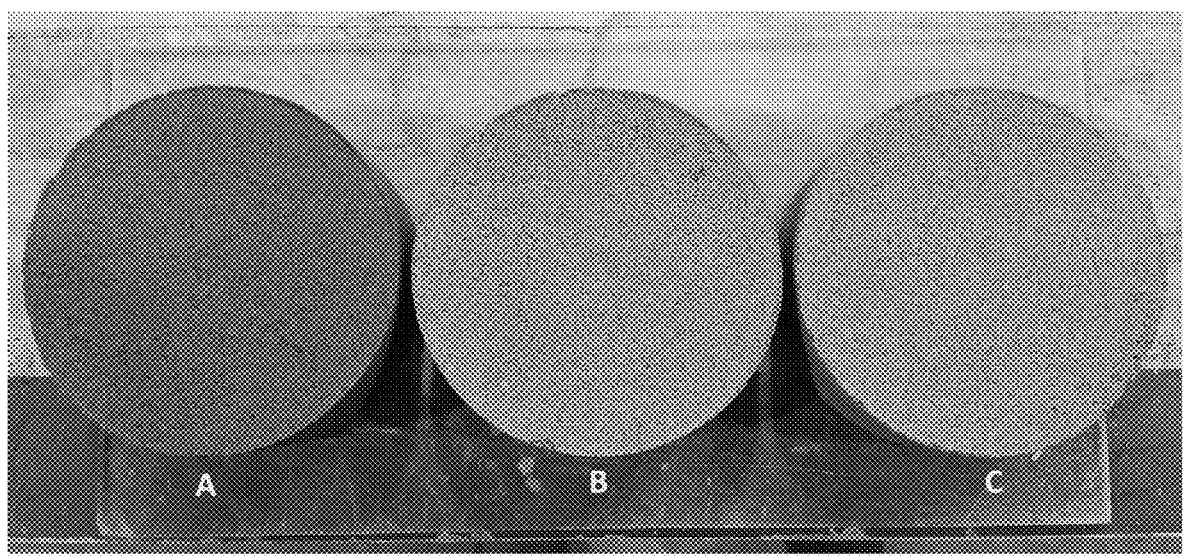
FIG. 7: Mortar specimens shown at the end of water absorption of the control (A), specimen, specimens containing (B) Na-oleate 1.0% and (C) Ca-stearate 1.0% (Example 2). Relative to the (A) control, specimens containing specimens of the invention containing (B) Na-oleate 1.0% and (C) Ca-stearate 1.0% exhibit reduced rate and total absorption of water.
Figure 8:
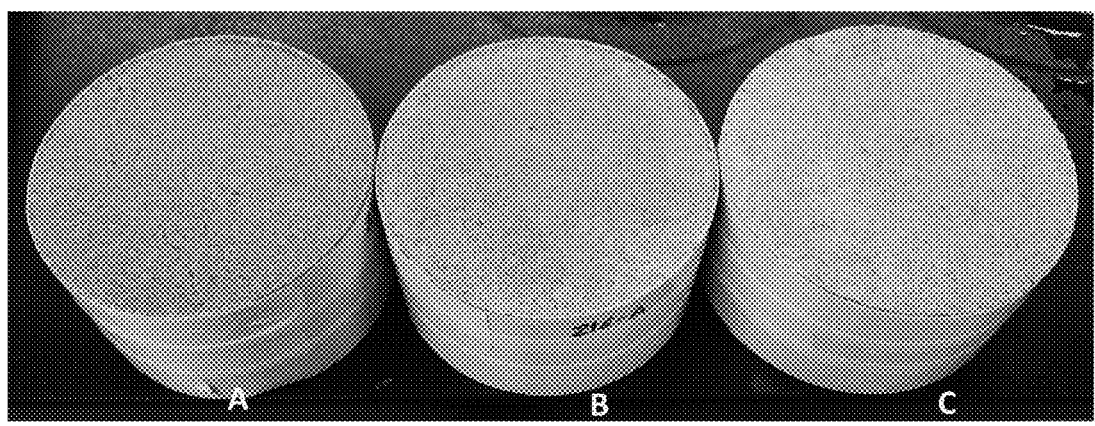
FIG. 8: Mortar specimens shown at the end of water absorption testing both with and without the addition of silanes (Example 6). Relative to the (A) control, specimens of the invention containing (B) Silane A and (C) Silane B.

Water sorptivity measurements for CCSC specimens containing representative salts of fatty acids and silanes are shown in FIG. 6. Both the salts of fatty acids and the silanes reduced the rate and total absorption of water relative to the control mix. Example specimens of each mix are shown in FIGS. 7 and 8 after sorptivity testing. Relative to the control mix, each of the mixes containing salts of fatty acids or silanes reduced the rate of water absorption and total quantity of water absorbed throughout the course of testing.

Figure 9:
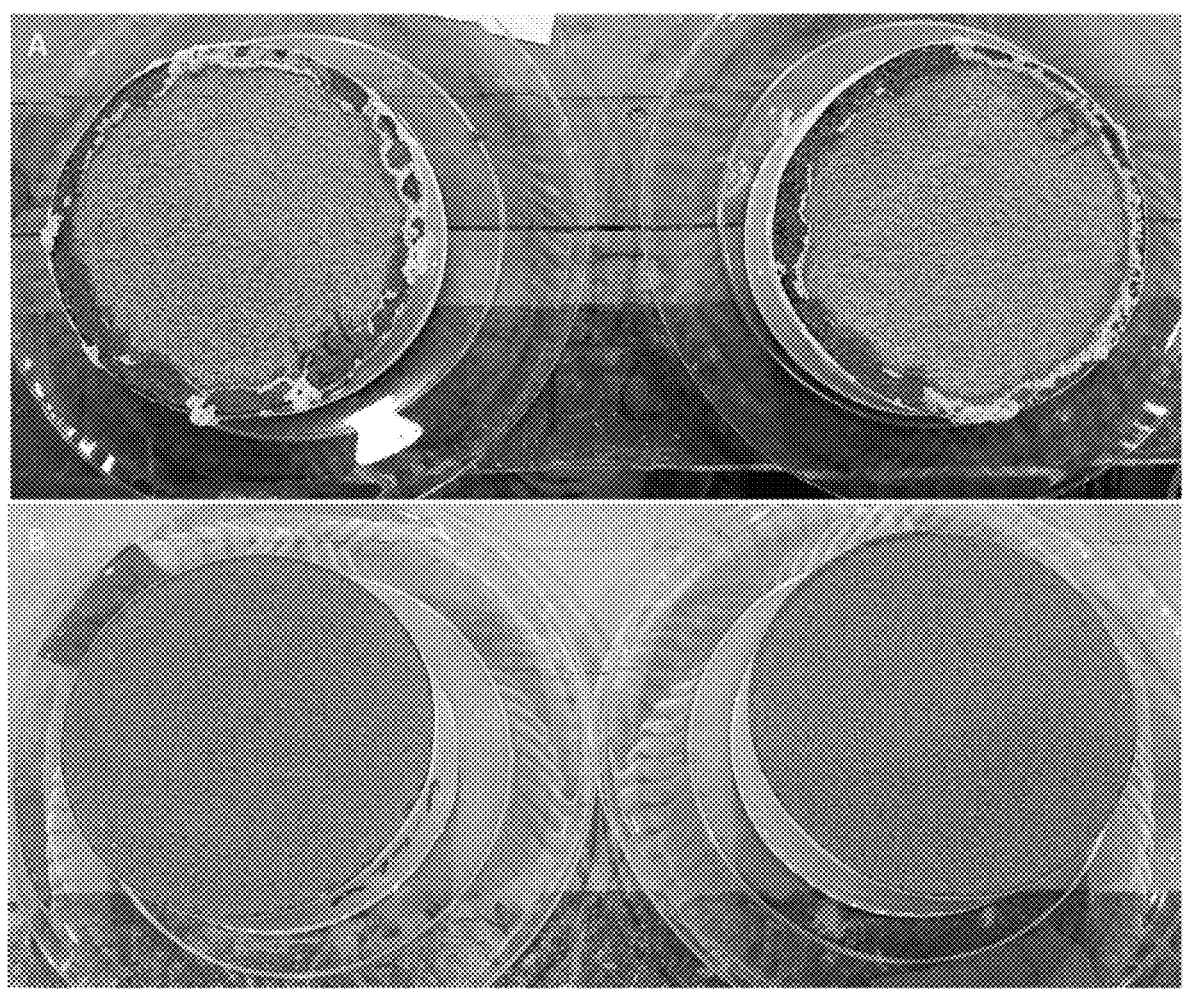
FIG. 9: Mortar specimens tested according to procedures outlined in ASTM C67 using 10% NaCl solution to simulate severe efflorescence (Example 6). Control samples (FIG. 9-A) exhibited significant deposition of surface salts while samples of the invention produced with 1.0% Ca-stearate (FIG. 9-B) exhibited limited ingress of water and no apparent deposition of surface salts.

Samples tested for efflorescence potential by partial submersion in NaCl solution are shown in FIG. 9 below. Control samples (FIG. 9-A) exhibited significant deposition of surface salts while samples produced with 1.0% Ca-stearate (FIG. 9-B) exhibited limited ingress of water and no apparent deposition of surface salts.

Testing in CCSC Concrete Products

Concrete pavers were produced using CCSC and raw materials supplied by two industrial concrete producers. Mix proportions are specified in the table below. Ca-stearate was added to the experimental batches during mixing with dosages ranging from 0.3 to 1.5 percent by weight of cement.

Pavers were tested for water absorption following procedures as specified in ASTM C140. In this test method, samples are immersed for 24 hours with no less than 6 in. (152 mm) of water above the surface of the specimen. Following immersion in water, samples are oven-dried at 100 to 115° C. until two successive weighings at intervals of 2 hours show an increment of loss no greater than 0.2% of the last previously determined weight.

In addition to testing for water absorption, concrete pavers produced with and without Ca-stearate were installed according to industry specifications and evaluated for performance during service through wetting and drying cycles.

The efflorescence mitigation potential of pavers produced with the addition of Ca-stearate was evaluated in comparison to reference pavers following procedures as outlined in ASTM C67. In order to simulate severe efflorescence, pavers were partially submerged in 10% NaCl solution.

TABLE 15

CCSC Concrete Mix Designs:

| Mix Component | Concrete Mix A | Concrete Mix B |
| --- | --- | --- |
| Cement 2 | 14.5% | 17.0% |
| Fine aggregate | 42.4% | 72.0% |
| Coarse aggregate I | 12.9% | 10.6% |
| Coarse aggregate II | 14.5% | — |
| Coarse aggregate III | 3.15% | — |
| Coarse aggregate IV | 12.4% | — |
| Pigment | 0.15% | 0.37% |

Figure 10:
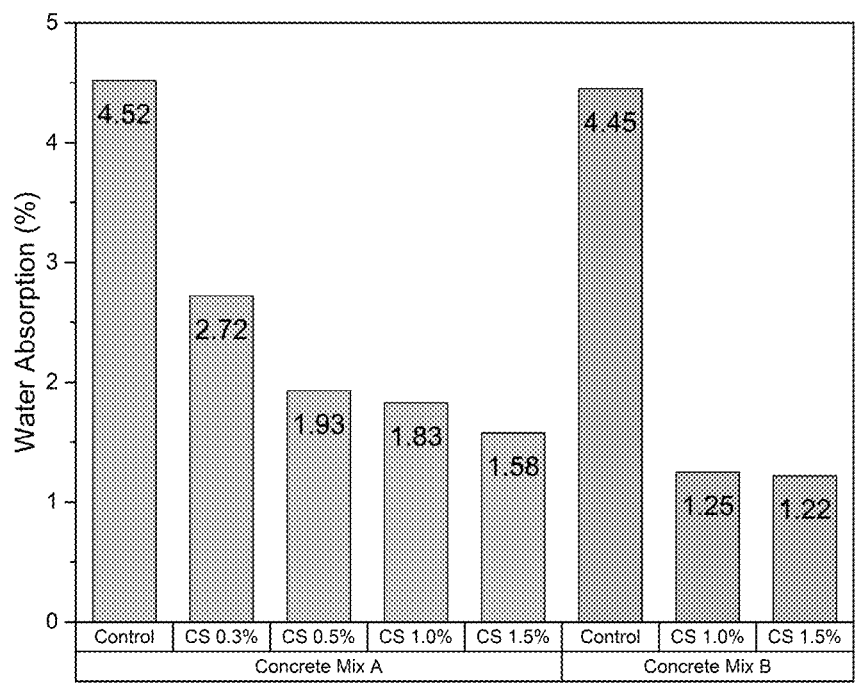
FIG. 10: Average water absorption of two different raw material concrete mixes produced with and without calcium stearate (CS) dosed by percent weight of cement (Example 6). At each of the tested dosages ranging from 0.3 to 1.5 percent by weight of cement, water absorption was significantly reduced in comparison to the control batches. The use of calcium stearate at each of the tested dosages reduced total water absorption relative to the control batches.
Figure 11:
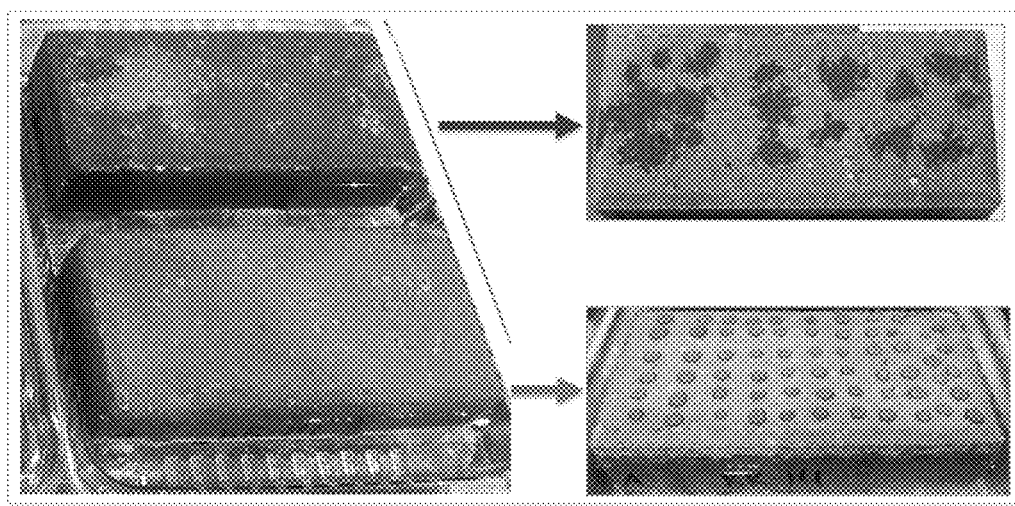
FIG. 11: Comparison between Concrete Mix B without Ca-stearate (top, control) and Concrete Mix B containing 1.0% Ca-stearate (bottom, invention) (Example 6). Pavers of the invention produced with Ca-stearate exhibit reduced ingress and permeation of water in comparison to control pavers.
Figure 12:
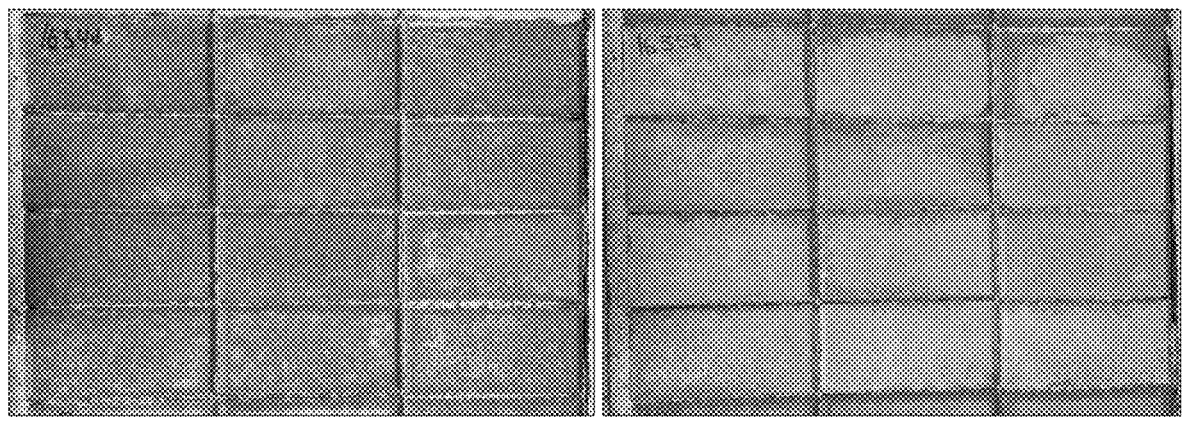
FIG. 12: Comparison between ground installations after rain exposure of pavers containing Concrete Mix A without Ca-stearate (left, control) and Concrete Mix A with 1.0% Ca-stearate (right, invention) (Example 6). Pavers of the invention produced with Ca-stearate exhibit reduced ingress and permeation of water in comparison to control pavers.

Average water absorption percentages of CCSC Concrete pavers produced without Ca-stearate (Control) and with Ca-stearate (CS) are shown in FIG. 10. At each of the tested dosages ranging from 0.3 to 1.5 percent by weight of cement, water absorption was significantly reduced in comparison to the control batches. The use of calcium stearate at each of the tested dosages reduced total water absorption relative to the control batches. As shown in FIG. 11 and FIG. 12, pavers produced with Ca-stearate exhibit reduced ingress and permeation of water in comparison to control pavers.

Figure 13:
FIG. 13: ASTM C67 efflorescence testing of CCSC pavers partially submerged in 10% NaCl solution (Example 6). After partial submersion in NaCl solution for 7 days, control pavers produced without Ca-stearate (FIG. 13-A) show significant ingress of water and deposition of surface salts while pavers of the invention produced with 1.0% Ca-stearate (FIG. 13-B) show reduced water ingress and reduced deposition of surface salts.

The mitigation of efflorescence resulting from the use of Ca-stearate is demonstrated in FIG. 13 below. After partial submersion in NaCl solution for 7 days, pavers produced without Ca-stearate (FIG. 13-A) show significant ingress of water and deposition of surface salts while pavers produced with 1.0% Ca-stearate (FIG. 13-B) show reduced water ingress and reduced deposition of surface salts.

The invention claimed is:

1. A non-hydraulic cement product comprising:
   a plurality of particles of a carbonatable calcium silicate cement, the calcium silicate comprising one or more discrete calcium silicate phases selected from CS (wollastonite or pseudowollastonite), C3S2 (rankinite), C2S (belite, larnite, bredigite), and an amorphous calcium silicate phase at about 30% or more by mass of the total phases;
   a first additive and a second additive;
   wherein, the first additive is a hydrophobic organic acid, or a salt thereof, or a silane, or a polysiloxane, and the second additive is an organic molecule with at least one primary, secondary or tertiary amine group.

2. The non-hydraulic cement product of claim 1, wherein the hydrophobic organic acid, or a salt thereof, is one or more fatty acid(s), or one or more salt(s) thereof.

3. The non-hydraulic cement product of claim 2, wherein the fatty acid, or a salt thereof, is selected from the group consisting of: a valeric acid, or a salt thereof; a stearic acid, or a salt thereof; an oleic acid, or a salt thereof; an arachidic acid, or a salt thereof; a palmitic acid, or a salt thereof; an arachidonic acid, or a salt thereof; an erucic acid, or a salt thereof; a linoleic acid, or a salt thereof; a linolenic acid, or a salt thereof; a lauric acid, or a salt thereof, or a combination thereof.

4. The non-hydraulic cement product of claim 3, wherein a salt of the fatty acid is a calcium stearate.

5. The non-hydraulic cement product of claim 1, wherein, the second additive also comprises at least one hydroxy group.

6. The non-hydraulic cement product of claim 5, wherein, the second additive is one or a combination of one or more hydroxyalkylamine(s) that has a maximum molar weight of 1000 g/mol.

7. The non-hydraulic cement product of claim 6, wherein, the second additive is selected from the group consisting of N,N bis-2(2-hydroxyethyl)-2-propanolamine) (DIEPA), N,N bis-(2-hydroxypropyl)-N-(hydroxyethyl) amine (EDIPA), diethanolamine (DEA), triethanolamine (TEA), triisopropanolamine (TIPA), triethylenepentamine (TEPA), hydroxyethyldiethylenetriamine (HEDETA) and aminoethylethanolamine (AEEA) or a combination thereof.

8. The non-hydraulic cement product of claim 1, wherein the first and second additives are calcium stearate and triethanolamine, respectively.

9. The non-hydraulic cement product of claim 8, wherein the first additive is present in an amount of 0.1 wt % to 2.0 wt % of the amount of cement, and the second additive is present in an amount of 0.1 wt % to 2.0 wt % of the amount of cement.

10. The non-hydraulic cement product of claim 1,
   wherein the first additive is selected from the group consisting of: a valeric acid, or a salt thereof; a stearic acid, or a salt thereof; an oleic acid, or a salt thereof; an arachidic acid, or a salt thereof; a palmitic acid, or a salt thereof; an arachidonic acid, or a salt thereof; an erucic acid, or a salt thereof; a linoleic acid, or a salt thereof; a linolenic acid, or a salt thereof, a lauric acid, or a salt thereof, or a combination thereof; and
   wherein the second additive is selected from the group consisting of N,N bis-2(2-hydroxyethyl)-2-propanolamine) (DIEPA), N,N bis-(2-hydroxypropyl)-N-(hydroxyethyl) amine (EDIPA), diethanolamine (DEA), triethanolamine (TEA), triisopropanolamine (TIPA), triethylenepentamine (TEPA), hydroxyethyldiethylenetriamine (HEDETA), and aminoethylethanolamine (AEEA), or a combination thereof.

11. The non-hydraulic cement product of claim 10, wherein the first and second additives are calcium stearate and triethanolamine, respectively.

12. The non-hydraulic cement product of claim 11, wherein the first additive is present in an amount of 0.1 wt % to 2.0 wt % of the amount of cement, and the second additive is present in an amount of 0.1 wt % to 2.0 wt % of the amount of cement.

13. The non-hydraulic cement product of claim 10, wherein the calcium silicate cement comprises from 30 to 55 wt % $SiO_2$ and 40 to 55 wt % CaO, relative to the total weight of oxides.

14. The non-hydraulic cement product of claim 13, wherein the calcium silicate cement comprises 1 to 8 wt % $Al_2O_3$, 0.1 to 5 wt % $Fe_2O_3$, and/or 0.1 to 2.5 wt % MgO, relative to the total weight of oxides.

15. The non-hydraulic cement product of claim 14, wherein the calcium silicate cement comprises 0.01 to 0.5 wt % $Na_2O$, 0.1 to 2 wt % $K_2O$; 0.01 to 0.5 wt % $TiO_2$, 0.01 to 1 wt % $P_2O_5$, and/or 0.01 to 0.5 wt % $Mn_2O_3$, relative to the total weight of oxides.

16. The non-hydraulic cement product of claim 10, wherein the first additive is present in an amount of 0.1 wt % to 2.0 wt % of the amount of cement, and the second additive is present in an amount of 0.1 wt % to 2.0 wt % of the amount of cement.

17. The non-hydraulic cement product of claim 1, wherein the first additive is present in an amount of 0.1 wt % to 2.0 wt % of the amount of cement.

18. The non-hydraulic cement product of claim 1, wherein the first additive is present in an amount of 0.1 wt % to 2.0 wt % of the amount of cement, and the second additive is present in an amount of 0.1 wt % to 2.0 wt % of the amount of cement.

19. The non-hydraulic cement product of claim 1, wherein the first additive is present in an amount of 0.1 wt % to 2.0 wt % of the amount of cement.

20. A concrete product comprising:
the non-hydraulic cement product of claim 1, wherein the cement product is cured with a greenhouse gas comprising carbon dioxide to produce a structure comprising of a core, wherein the core comprises of a portion of the unreacted calcium silicate particle;
a silica-rich layer covering at least a portion of the surface of the core; and
an exterior layer covering at least a portion of the silica-rich first layer, wherein, the exterior layer comprises calcium carbonate; and
a plurality of aggregate particles.

21. A method for preparing a concrete product comprising:
mixing the non-hydraulic cement product of claim 1 with a plurality of aggregate particles to form a concrete product having a plurality of pores;
placing and forming the concrete product in molds;
curing the formed concrete product with a greenhouse gas comprising carbon dioxide to produce a structure comprising of a core, wherein the core comprises of a portion of the unreacted carbonatable calcium silicate particle;
a silica-rich layer covering at least a portion of the surface of the core; and
an exterior layer covering at least a portion of the silica-rich first layer, wherein, the exterior layer comprises calcium carbonate.

* * * * *